United States Patent
Smyth et al.

(10) Patent No.: US 7,167,079 B2
(45) Date of Patent: Jan. 23, 2007

(54) METHOD OF SETTING THE OUTPUT POWER OF A PAGER TO AID IN THE INSTALLATION OF A WIRELESS SYSTEM

(75) Inventors: Michael S. Smyth, Andrews, IN (US); Raymond J. Archacki, Jr., Wethersfield, CT (US)

(73) Assignee: Carrier Corporation, Farmington, CT (US)

( * ) Notice: Subject to any disclaimer, the term of this patent is extended or adjusted under 35 U.S.C. 154(b) by 332 days.

(21) Appl. No.: 10/807,596

(22) Filed: Mar. 24, 2004

(65) Prior Publication Data

US 2005/0215237 A1    Sep. 29, 2005

(51) Int. Cl.
  *G08B 5/22*    (2006.01)
  *H04Q 1/30*    (2006.01)
  *H04Q 7/00*    (2006.01)

(52) U.S. Cl. ............... 340/7.21; 340/7.24; 340/7.32

(58) Field of Classification Search ......... 340/7.21–7.24, 340/7.32, 825.69, 825.72, 539.1, 539.11, 340/539.14, 539.21, 539.26, 426.21; 455/420, 455/226.1; 236/46; 364/514
See application file for complete search history.

(56) References Cited

U.S. PATENT DOCUMENTS

| | | | |
|---|---|---|---|
| 4,322,842 A * | 3/1982 | Martinez | 370/204 |
| 4,512,033 A | 4/1985 | Schrock | |
| 5,293,639 A * | 3/1994 | Wilson et al. | 455/17 |
| 5,606,725 A | 2/1997 | Hart | |
| 5,608,655 A * | 3/1997 | Moughanni et al. | 340/7.1 |
| 5,710,981 A * | 1/1998 | Kim et al. | 455/69 |
| 6,131,021 A * | 10/2000 | Lussenhop et al. | 455/226.2 |
| 6,366,195 B1 * | 4/2002 | Harel et al. | 340/7.21 |
| 6,374,101 B1 * | 4/2002 | Gelbien | 455/420 |
| 6,467,092 B1 | 10/2002 | Geile et al. | |
| 6,622,925 B1 * | 9/2003 | Carner et al. | 236/46 R |
| 7,009,493 B1 * | 3/2006 | Howard et al. | 340/7.1 |

* cited by examiner

*Primary Examiner*—Wendy R. Garber
*Assistant Examiner*—Nam Nguyen
(74) *Attorney, Agent, or Firm*—Peter J. Bilinski

(57) ABSTRACT

A method of setting up a remotely controlled wireless thermostat system for regulating heating and cooling a building. A radio equipped pager is connected to the programmable controller of the thermostat and a self test is conducted to determine if the system can successfully communicate with the service providers network at a first low power pager output. If not, the power output of the pager is incrementally increased within an acceptable output power range until such time that successful communication is established with the network. This power setting is placed in memory for use thereafter in communicating with the network.

8 Claims, 2 Drawing Sheets

METHOD OF SETTING THE OUTPUT POWER OF A PAGER TO AID IN THE INSTALLATION OF A WIRELESS SYSTEM

FIELD OF THE INVENTION

This invention relates generally to a method of setting up a remotely controlled wireless system at the time of installation or anytime thereafter to insure that the system can both transmit and receive message between itself and a local network service provider. The method is ideally suited for use in a wireless remote controlled thermostat system.

BACKGROUND OF THE INVENTION

Currently, remotely controlled wireless systems of this nature are in relatively wide spread use in urban areas that contain large building and have a relatively dense population. Proper use of the system allows building owners and occupants to realize substantial savings in energy and also permits utilities to more efficiently regulate distribution particularly during periods of peak consumption thereby avoiding brownouts and grid failures.

At the time of installation most remote units undergo a self test to insure that the unit is communicating properly with the local service provider network. The installer typically runs a coverage test using a coverage verification unit (CVU) in which the units radio is set at a relatively low power output, as for example 1 watt. In some cases the coverage test will show that the thermostat can receive and carry out commands from the service providers transmitter but cannot transmit back messages to the service provider. The one way system may be kept in service but it will not be able to confirm receipt of messages or that the instructions have been uploaded or carried out. In other cases, the coverage test shows that the thermostat system when operating at the low power output can neither send or receive messages and as a result the system is deemed to be unusable.

Although most pager modules can operate within an output power range, as for example between 1 to 2 watts, most pager modules currently are set to operate at the low end of the range at the request of the service provider. This is done so that towers in areas of good or normal coverage do not become overloaded with incoming messages. Normally a pager module operating at the low end of the range can reach between one and five towers. In the event the pagers output is increased to the top end of the range, it may be able to reach dozens of towers thereby slowing down the network as the duplicate messages are filtered out.

It has been found that by increasing the power output of pager modules employed in failed or one way systems can successfully bring these systems to a fully operative functional state. In many cases the increase in power necessary to restore full operation may be slight. In other cases where the thermostat is located in a less than normal coverage area, the pager modules power can be increases to a greater extent to restore full operation of the system without overloading network providers system because the pagers signal will only be capable of reaching a limited number of towers.

SUMMARY OF THE INVENTION

It is a primary object of the present invention to improve remotely controlled wireless thermostat systems.

It is a further object of the present invention to increase the power output of a pager module employed in a wireless remotely controlled thermostat system without overloading the service providers network.

A still further object of the present invention is to restore one way and failed remotely controlled wireless thermostat systems to fully operational systems without adversely effecting the service providers network.

These and other objects of the present invention are attained by providing a pager module employed in a wireless remotely controlled thermostat system with a variable power output and connecting the pager to the thermostat's programmable controller containing an algorithm for incrementally increasing the power output of the pager between a low power setting and a high power setting. An initial low power signal is sent to the service provider network and a determination is made if the signal has been received by the network. If not, the output power setting is incrementally raised within the power output range of the pager until such time as a message is successfully transmitted to the network. This power setting is then programmed into the controllers memory and used thereafter to transmit messages to the network.

BRIEF DESCRIPTION OF THE DRAWINGS

For a better understanding of these and objects of the invention, reference will be made to the following detailed description of the invention which is to be read in association with the accompanying drawings; wherein.

DETAILED DESCRIPTION OF THE INVENTION

Figure 1:
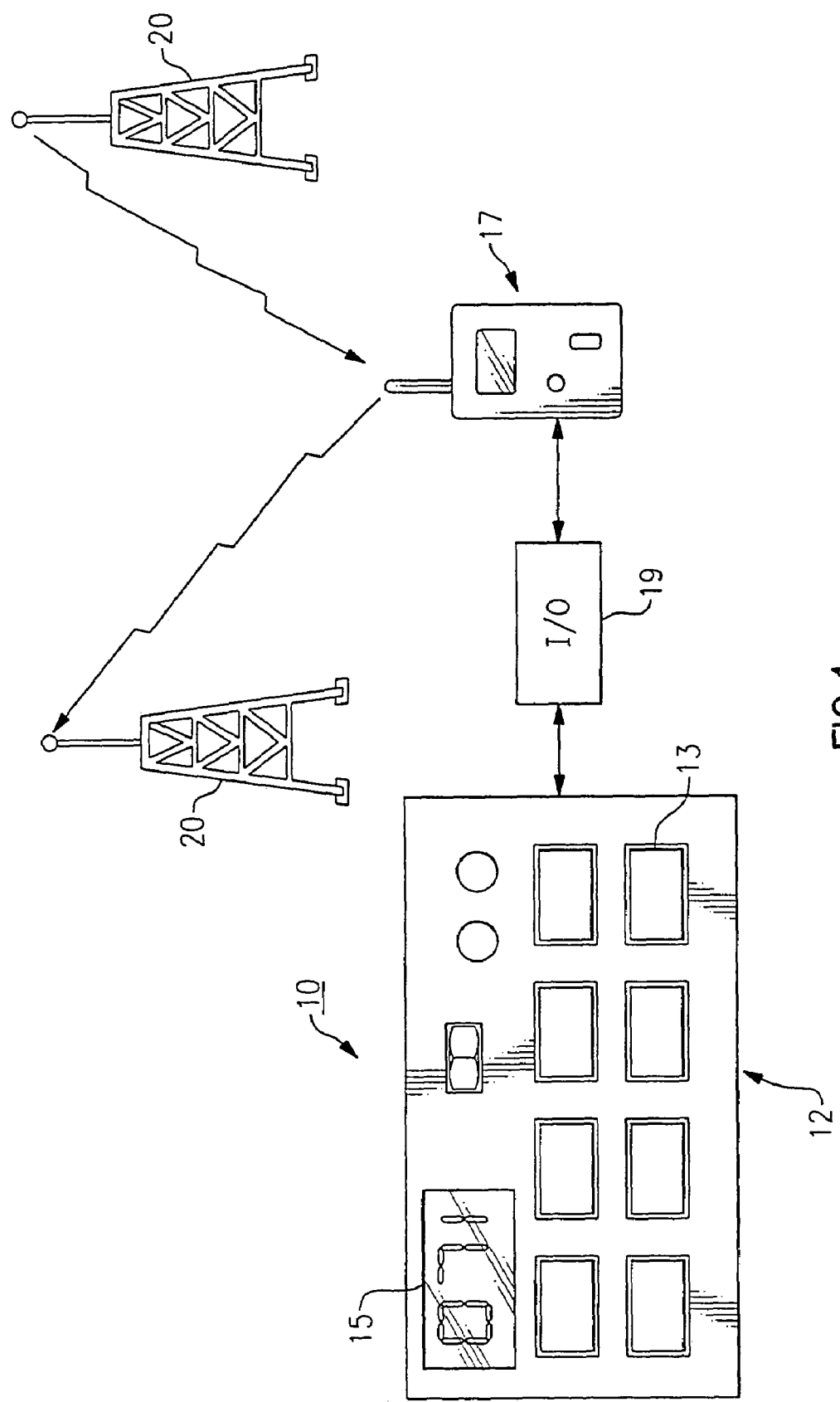
FIG. 1 is a schematic drawing illustrating a wireless system embodying the teachings of the present invention.

As noted above, wireless systems for controlling the activity of a remote thermostat have been in use for some time. As illustrated in FIG. 1, the system 10 contains a thermostat 12 that has a programmable controller that can be programmed manually using a touch pad 13 or remotely through means of a wireless network that is typically owned and operated by a local service provider. The temperature and other data stored in the controller is displayed in window 15. The thermostat controller is connected to a pager module 17 through means of an I/O board 19. The pager module is equipped with both a transmitter and a receiver so that it can communicate with one or more towers 20 in the local service providers network.

The pager is typically set to operate at a low power output, as for example 1 watt, so that its transmissions will reach only a limited number of towers in the network. As noted above, this is done to prevent transmitter located in areas of normal or good coverage from being overloaded with duplicate messages. Increasing the output of a pager to its maximum output level for example 2 watts, would enable the pager to reach dozens of towers thus slowing down the network because it must filter out all the duplicate receptions of the same message.

After the system has been installed, the installer will run a radio self test during which a wireless message is through the network to verify that the system can both send and receive messages. Heretofore, if the system fails to communicate with the network there was nothing more that the installer could do.

Figure 2:
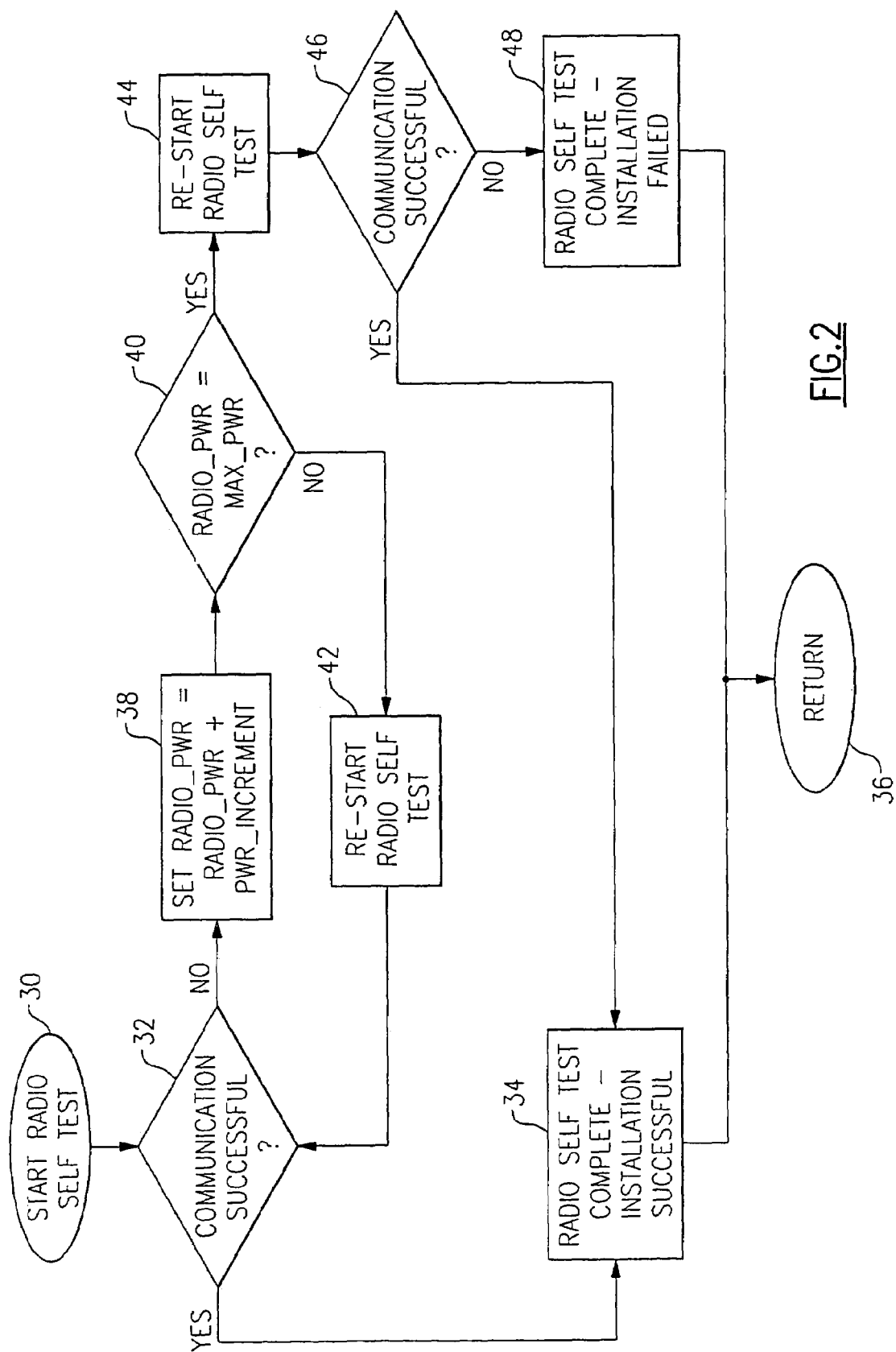
FIG. 2 is a flow diagram illustrating set of operational sequences for adjusting the power output of a remotely controlled wireless thermostat system without overloading the service providers network.

Applicant has been found that in many cases, increasing the power output of the pager will result in the system being able to communicate successfully with the network thus restoring what would otherwise be a failed system to full operation. To simultaneously satisfy the needs of the installer while still restricting access to the radio power setting, the self test is enhanced by the method of the present invention to permit the power output of the pager module to be adjusted according to an algorithm that is contained in the thermostat controller. The algorithm is described with reference to the flow diagram illustrated in FIG. 2.

The pager module employed in this embodiment of the invention is designed to operate within an output power range of between 1 and 2 watts. However, it should become evident from the disclosure below that any suitable range is applicable to he service providers network may be employed in the practice of the present invention.

The pagers radio power will automatically default to 1 watt at the start of an initial self test run at step 30. A message demanding a response is transmitted to the network which in turn radios back a response indicating the message was received at the 1 watt output and a determination is made at step 32 as to whether or not the test was successful. The test is noted as being successfully completed at step 34 and the 1 watt power setting is placed in memory and the pager is programmed to operate at this power output with regard to further transmissions. The controller is returned to normal operations at step 36.

As further illustrated by the flow diagram, in the event the initial self test fails to successfully communicate with the network, the algorithm allow the installer to increase the pager power output by some given increment within the pagers output power range at step 3. In this example, the pagers output can be increased between a low setting of 1 watt and a high setting of 2 watts which is not untypical within the industry. Each increment may be some percentage of a watt as for example 0.1 or 0.2 watts or any other suitable increment that might be acceptable to the network.

The new power setting is checked at step 40 to see if it is at the max acceptable power. If not a second self test is initiated at the new higher power setting and step 32 is repeated to determine if the system can successfully communicate at the new higher power setting. If it can, the new power setting is stored in memory at step 34 and the system returns to normal operations at step 38 with the pager now programmed to transmit at the higher power setting.

In the event the second self-test fails, the algorithm allows the installer to increase the output power to the next higher increment and steps 38, 40 and 42 are again repeated until such time as successful communications are established with the network or until the incrementations reach the maximum pager power output which in this case is 2 watts. When maximum power is reached at step 40 a final self test is initiated at step 44. A determination is made at step 46 to see if communications with the network have been successfully established, and if so, the maximum power outlet is set into memory at step 34 and the system returned to normal operation. If the final test is not successful, the system is deemed to be unsuitable for use with the network.

As can be seen, this method allows the installer to increase the pager power output on-site to prevent an excessive output of power. The selected power setting is dependent on the networks coverage in the area and is set at an optimum level for efficient performance based upon local network conditions.

Although the algorithm of the present invention has been described with reference to an installed thermostat system, it could be used in association with a battery operated coverage verification unit (CVU) where the steps of the algorithm are carried out by the unit to determine if the system can communicate with the network within an acceptable power output range. If so the acceptable power setting is then programmed into the system controller and locked in memory so that the pager is set to operate at this locked in value and preventing any further increases in power to be implemented by the installer.

In general, the power output of the pager can be in any acceptable range and the increase in increments can be any percentage of this range and is only limited by the power range the particular pager module employed in the system.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of setting up a remotely controlled wireless thermostat system that includes the steps of:
   providing a radio equipped pager for transmitting and receiving messages;
   connecting the pager to a programmable controller of a remotely controllable thermostat system, said controller containing an algorithm for adjusting the power output of the pager;
   transmitting a message from the pager to a local service provider network at an initial low power setting;
   determining if the message has been successfully transmitted and if not, increasing the power setting of the pager to a next high increment;
   retransmitting said message wherein the power setting is incrementally increased from the lowest power increment until such time as said message is successfully transmitted to the network; and
   locking the power setting at which a message is successfully transmitted into memory and thereafter operating the pager at the stored power setting.

2. The method of claim 1 wherein said algorithm is arranged to incrementally adjust the power setting of the pager within a given power range.

3. The method of claim 2 wherein each increment is some percentage of the power range.

4. The method of claim 3 wherein said power range is between 1 and 2 watts.

5. The method of claim 1 that includes the further step of preventing the power output of the pager from being further incremented once it is determined that a message has been successfully transmitted.

6. A method of setting up a remotely controlled wireless thermostat having a programmable controller for connecting the thermostat to a radio pager for transmitting and receiving messages from a local service provider network, the method including:
   providing a coverage verification unit for transmitting and receiving messages from the wireless network within the power output range of the pager;
   transmitting a message from the thermostat site to a local wireless network at the lowest power output of said range;
   determining if the message has been successfully transmitted and if not, increasing the power output of the unit by an increment within said range; and
   retransmitting the message;

programming the system controller to transmit messages to the network at the incremental power output setting at which a message was first successfully transmitted to the network; and manually programming said incremental power output setting into the system controller and locking said setting in memory whereby further increases in the power output are prevented.

7. The method of claim 6 of incrementally increasing the output power of the unit within said range until such time as a message is successfully transmitted to the network.

8. The method of claim 6 wherein the message transmitted to the network by the unit demands a response back from the network.

\* \* \* \* \*